United States Patent [19]

Clement

[11] 4,035,905

[45] July 19, 1977

[54] WET ELECTROLYTE VALVE METAL CAPACITOR WITH A FREE-FORM ENCAPSULANT

[75] Inventor: Warren J. Clement, Williamstown, Mass.

[73] Assignee: Sprague Electric Company, North Adams, Mass.

[21] Appl. No.: 664,787

[22] Filed: Mar. 8, 1976

[51] Int. Cl.² .............................................. B01J 17/00
[52] U.S. Cl. ........................................ 29/570; 29/588; 264/272; 361/433
[58] Field of Search ................... 29/570, 588; 264/272

[56] References Cited

U.S. PATENT DOCUMENTS

| 2,628,271 | 2/1953 | Brafman | 361/433 |
| 2,636,076 | 4/1953 | Ness | 29/570 |
| 2,970,182 | 1/1961 | Miquelis | 174/52 |
| 3,261,902 | 7/1966 | Pearce | 264/272 |
| 3,353,072 | 11/1967 | Peck | 361/433 |
| 3,436,610 | 4/1969 | Sparrow | 361/433 |
| 3,971,970 | 7/1976 | Voyles | 29/570 |

*Primary Examiner*—W. Tupman
*Attorney, Agent, or Firm*—Connolly and Hutz

[57] ABSTRACT

A plastic impregnation header has two holes through which two leads of a dry electrolytic capacitor section are threaded. The header is seated against the section. The header has a tubular portion extending away from the section. The section is dip coated in an epoxy resin mixture so as to encapsulate the section, a portion of the extending leads and the header. After curing the encapsulant, the section is impregnated with a liquid electrolyte through the tube and the tube is sealed closed.

11 Claims, 9 Drawing Figures

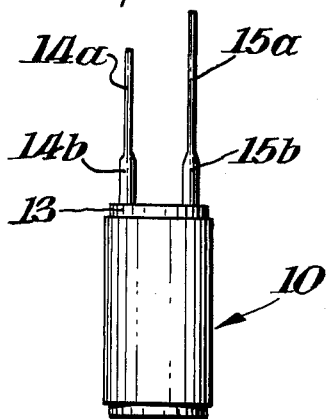
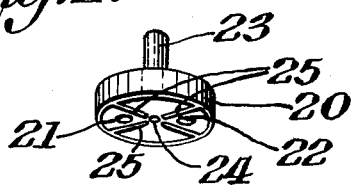
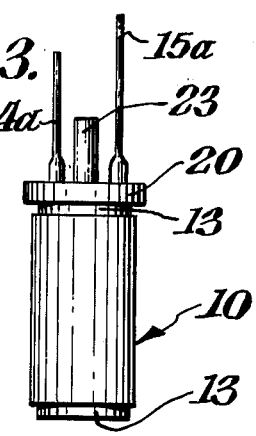
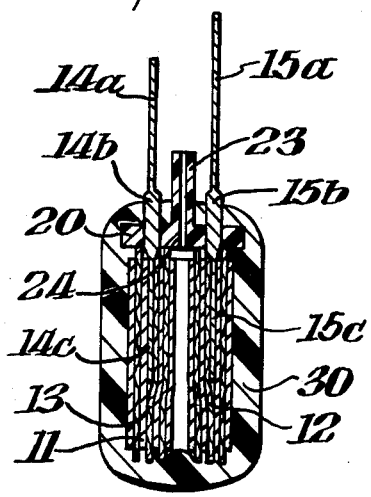
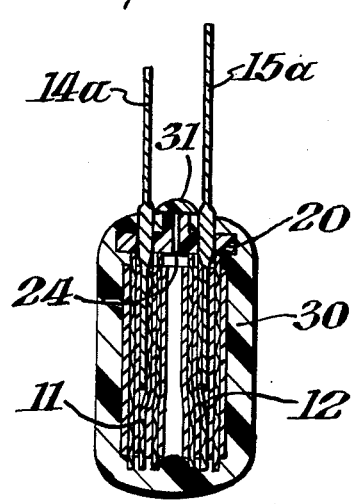
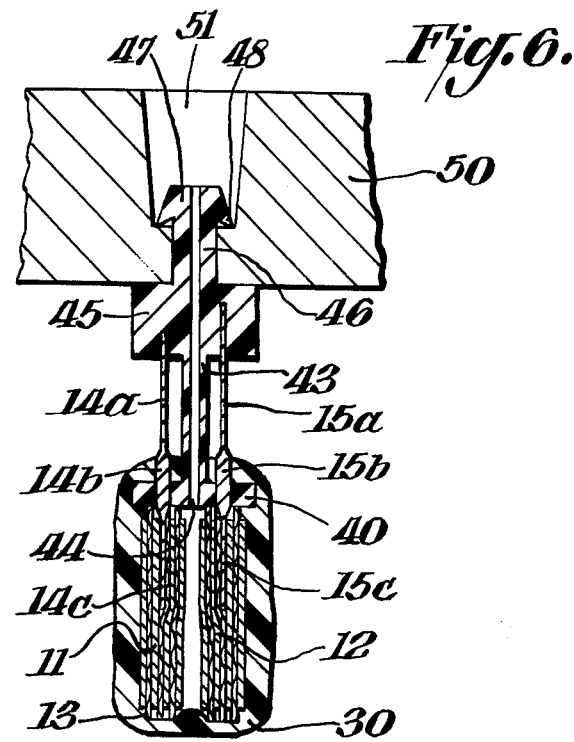
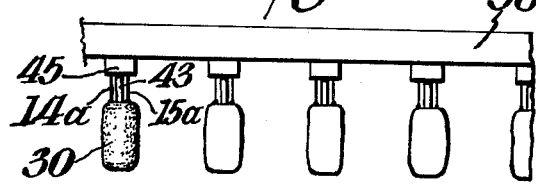
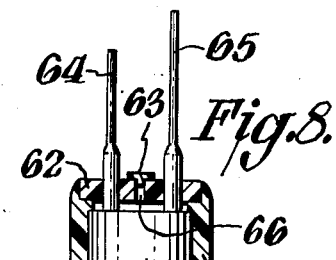
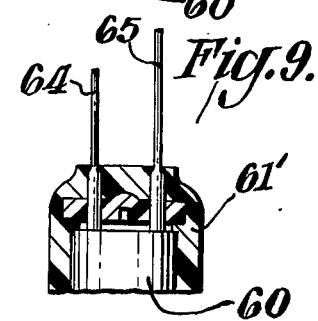

WET ELECTROLYTE VALVE METAL CAPACITOR WITH A FREE-FORM ENCAPSULANT

BACKGROUND OF THE INVENTION

This invention relates to a wet electrolyte valve-metal capacitor having a free-form encapsulant, and more particularly to such a capacitor that includes a sealed impregnation header.

It is known to make a wet electrolyte capacitor by encapsulating the dry capacitor section in a covering of epoxy or the like as by molding. Such molded coatings have a highly disciplined geometry that is particularly advantageous for producing axial leaded parts that are intended for automatic insertion into printed circuit boards. Such parts are typically provided with a tubular metal riser lead portion or lead eyelet through which the molded capacitor section is impregnated with electrolyte prior to sealing the eyelet and attaching a lead wire thereto. Examples of such capacitors are described by Brafman, U.S. Pat. No. 2,628,271 issued Feb. 10, 1953 and by Ness et al, U.S. Pat. No. 2,869,052 issued Jan. 13, 1959, both having the same assignee as the instant invention.

It is also known to make a wet electrolyte capacitor by coating a wet capacitor section with a reagent that seals the wet section and subsequently dip coating the protected wet section in epoxy followed by curing. Such a construction is described by Peck et al, U.S. Pat. No. 3,353,072 issued Nov. 14, 1969 and also assigned to the same assignee. This capacitor however is limited to the use of borate type electrolytes and requires an extra step in manufacture. It is not known to apply a wet or an uncured thermosetting resin coating directly to a wet capacitor section for two reasons.

The presence of a wet electrolyte adjacent to the uncured resin tends to inhibit curing, so at least the inner surface of the resin remains incompletely cured. Many resins and particularly most epoxies contain hydrolyzable chlorides, which in the partially cured resin interface are subject to a further chemical attack by the liquid electrolyte whereby chloride ions are released into the electrolyte. The chloride ions are highly corrosive to the valve-metal parts of the capacitor section and tend to greatly reduce the useful life of the capacitor, especially at elevated temperature and voltage.

Free-form encapsulants such as dip coats are known to be significantly less costly than molded or cast encapsulants, but a compatible method for introducing the electrolyte into a cured free-form coating while retaining the low cost advantages thereof has heretofore not been available.

It is therefore an object of the present invention to provide a low cost wet electrolyte valve-metal capacitor.

It is another object of the present invention to provide a wet electrolyte capacitor that is capable of being impregnated with an electrolyte and sealed after a free-form encapsulant is formed and cured.

SUMMARY OF THE INVENTION

A wet electrolyte valve-metal capacitor having a free-form encapsulant is made by preparing a dry electrolytic capacitor section with two leads extending therefrom in the same direction. An impregnation header, preferably of a plastic insulating material, has two parallel holes with a spacing about equal to the spacing of the parallel leads. The header is threaded onto the leads and seated against the section. The header additionally has a tubular portion with a hole that extends from the section in the same direction as the extending leads.

Now by holding this assembly by the leads, the section is dipped in or otherwise coated by an encapsulating material such as epoxy, and the encapsulant is subsequently cured. The encapsulating free-form coating encloses the section and covers a portion of the leads and the header. An electrolyte is introduced into the section via the tubular portion of the header, the tubular portion thereafter being sealed closed.

The completed capacitor has a free-form thermoset type encapsulating coating and two so-called "radial" leads, that may be simultaneously inserted into holes in a printed wiring board and soldered thereto. The term free-form, as used herein, refers to encapsulating coatings that are only roughly conformal to the encapsulated body and are distinguished from molded or cast encapsulating coatings that are characterized as having a highly disciplined geometry reflecting precisely the geometry of a mold cavity.

Low cost free-form coatings may be applied by methods other than dipping, such as applying an uncured-epoxy-powder coating, or spray coating and curing. All of these methods for applying a free-form encapsulating coating offer a substantially reduced coat compared to the conventional encapsulating methods of injection molding, transfer molding, or casting in a shell or casting in a removable mold cavity. Furthermore the free-form coatings over a capacitor section having at least one sharp corner, e.g. a cylindrical form, tend to be thinner in the region of such corners than over the adjacent continuous areas of the section, thereby providing a weakened region in the encapsulant. This advantageously serves as a non-violent venting means for the encapsulated wet electrolyte capacitor without any additional steps to provide this desirable feature. For capacitor sections of given geometry, the application of a predetermined and controlled quantity of the encapsulating material to each section provides capacitors that consistently vent by breaking away the weakened region at the desired internal pressure. The rheological properties of the coating at application and during curing may also be adjusted by solvents and inert particle additives to achieve the desired degree of thinning at the section corners. Thermosetting resin encapsulant such as epoxy are preferred as providing a strong protective covering and as having easily adjustable rheological properties, but thermoplastic encapsulants are also suitable.

The capacitor of the present invention has the advantage of very low associated manufacturing costs, especially in comparison with conventional molded or cast parts. It is furthermore subject to even further reduced costs since it is ideally suited to automated manufacture. For example, an extension of the tubular portion of the header may be designed for holding the tips of the lead wires. The extended headers may be in turn be designed to be held in multiples by a carrier bar during which all the encapsulating impregnation and tube sealing steps are effected.

BRIEF DESCRIPTION OF THE DRAWING

In FIG. 1 there is shown in side view a dry capacitor section having two leads.

In FIG. 2 there is shown in perspective view of plastic impregnation header.

In FIG. 3 there is shown in side view the capacitor section of FIG. 1 with the header of FIG. 2 assembled thereto.

In FIG. 4 there is shown in side sectional view the assembly of FIG. 3 after application of a free-form encapsulating coating.

In FIG. 5 there is shown in side sectional view the encapsulated section of FIG. 4 after a liquid electrolyte has been introduced into the capacitor section and the tubular portion of the header has been cut off and sealed closed.

In FIG. 6 there is shown in side sectional view a capacitor of this invention, connected to a carrier bar by extended parts of the header in the course of manufacture.

In FIG. 7 there is shown in side view the capacitor and carrier bar of FIG. 6 with additional identical capacitors connected to the bar to make possible the simultaneous processing of the plurality of capacitors.

In FIG. 8 there is shown in side sectional view a portion of another capacitor of this invention prior to final encapsulation.

In FIG. 9 there is shown the capacitor of FIG. 8 after being sealed and fully encapsulated.

DESCRIPTION OF THE PREFERRED EMBODIMENTS

The first preferred embodiment of this invention is represented by FIG. 5 whereas FIGS. 1 through 4 show it in progressive stages of assembly.

A capacitor section 10 is comprised of two aluminum foils 11 and 12 having porous paper spacers 13 therebetween. Two leads 14 and 15 are attached to the foils 11 and 12 respectively. Each lead has a wire portion (14a and 15a), a riser portion (14b and 15b) and a flattened strip portion (14c and 15c). At least one foil, e.g. 12, has a thin film of aluminum oxide formed over all surfaces. The foils, spacer and attached leads are wound into a dry capacitor section 10 having the two leads both extending away from the wound section in an axial direction. Such a leader and wound capacitor section is described in more detail in the patent to Peck et al, U.S. Pat. No. 3,976,922 issued Aug. 24, 1976, and having the same assignee.

More generally the foils 11 and 12 may be any valvemetal, that is a film forming metal such as aluminum or tantalum. Also the porous spacers 13 may be any suitable porous sheet material. An impregnation header 20 is shown in FIG. 2 having two parallel holes 21 and 22 that have the same spacing as the leads 14 and 15 in FIG. 1. The header 20 also has a tubular portion 23 and a hole 24 extends there through. The bottom face also has projections or ribs 25 that are advantageous in admitting liquid electrolyte to the section.

After winding the section 10 the leads 14 and 15 are threaded into holes 21 and 22, respectively, of the header 20 and the header is seated against the section. More specifically the lower extremities, as shown, of the header ribs 25 are seated against the extended edges of the spacer sheets 13 of section 10. It is preferable that the header holes 21 and 22 are slightly larger than the diameter of the riser lead portions 14b and 15b, respectively, to make the threading step easy to accomplish but at the same time providing good registration of the round bottom portion of the header and the seating end of the cylindrical section. The header is preferably of a thermoplastic material that can be made by a low cost injection molding process.

When the section 10 is assembled with header 20 as shown in FIG. 3, the assembly may be held by the leads and dipped into a liquid epoxy or other suitable encapsulant so that the encapsulant covers the section and a portion of the leads and header as shown in FIG. 4. The encapsulation is then cured to a strong solid protective mass 30. At this point in manufacture, the only acess to the interior of the capacitor section from outside the encapsulated assembly is through the hole 24 of the header 20.

By placing the assembly in a vacuum, most of the air within the encapsulation is removed and while still evacuated a liquid electrolyte, not illustrated, is introduced through the tube 23 to the section 10 where it impregnates the section. The spaces between the ribs 25 of the header 20 provide channels for the flow of liquid electrolyte between the hole 24 and the entire end of the would section 10 to achieve a rapid and thorough impregnation of the section. A suitable electrolyte is amoniumborate ethylene glycol. Many other electrolytes are also suitable such as amonium adipate ethylene glycol.

Although, immediately after introducing the electrolyte through the hole 24 to the section 10, the liquid level in the interior of the encapsulant 30 is quite high, the spacer 13 of the section becomes saturated with the electrolyte and then especially after aging with the capacitor upside down relative to the position shown, essentially no free fluid electrolyte remains thereafter in the interoir spaces of the capacitor package.

After impregnation the outward end of the tube 23 may be cut off essentially flush with the encapsulant 30. The remaining part of tube 23 is now sealed closed as shown in FIG. 5 by application of a small quantity of epoxy 31 which is subsequently cured.

An alternative process for making a capacitor of this invention includes the provision of a plastic header 40 as shown in FIG. 6 that is similar to the header 20 that is shown in FIG. 2, except at the outer end of the tubular portion 43 there is a block 45, a neck 46 and a spurred plug 47. The hole 44 of the tube 43 extends clear through these various parts of the header.

As in the first described process a dry electrolytic capacitor section is wound, the section leads 14 and 15 are threaded into holes provided in the header bottom and the header seated against the section. The header 40 is so constructed that two holes are provided in the block 45 to receive in force fit relationship the ends of lead wires 14a and 15a, as the header 40 is seated against the section. The plug 47 is then inserted into a hole 51 in a carrier bar or plate 50. The upper part of the hole 51 is enlarged and the spurs or spur 48 of the header plug locks and seals the header to the carrier bar 50 with the header block 45 stopped against the bottom of the bar. A plurality of leaded and headed sections as shown in FIG. 7 may thus be held in a single carrier bar 50. The plurality of capacitors may then be completed essentially as previously described, but in multiples. For example, the capacitor sections may be dipped as a group in a liquid epoxy encapsulant, cured, impregnated through the bar 51 and header hole 44, the central portion of tube 43 cut away and the remaining portion of tube 43 sealed closed. Furthermore, the sections are held in an ordered arrangement suitable for making electrical contact to all their terminals for testing, intermediate electrolytic forming steps, aging, sealing, printing or stamping an identification mark on the bodies, and any other such operations, prior to removal from the bar.

As is known in the art it is important to age the capacitor after impregnation by applying a voltage that is somewhat higher than the maximum expected or rated voltage of ultimate use and simultaneously exposing the capacitor to a temperature in excess of rated temperature. Since in use, the vapor pressure of the electrolyte and other interior material will never exceed that developed at aging, it is considered essential that the aging be performed just prior to sealing the header.

The plastic impregnation header is preferably made of a thermoplastic material such as polypropylene so as to permit a simple heat reflow method of sealing the tube closed. To exploit this feature, the above described method for making a capacitor may be modified as follows and as illustrated in FIGS. 8 and 9.

A first cured dip coating 61 of epoxy encapsulant covers the capacitor section 60 illustrated in FIG. 8, but this first coating is not allowed to extend substantially over the top of the thermoplastic header 62. The unit is now impregnated and aged as described above after which the header tube is cut off and sealing steps may be accomplished simultaneously by using hot pincers that by a combination of mechanical cutting force and heat, pinch the tube off about flush with the top of the header and locally reflow the thermoplastic material to effect the seal. Alternatively, the tube may be cut off mechanically, a plug 63 of similar thermoplastic material placed over or partly inserted into the tube hole 66 of the header, and a hot soldering iron applied to fuse and reflow the plug over the hole.

A second dip coating of epoxy may be applied over the first and cured so as to completely cover the thermoplastically sealed header, and to form a composite encapsulating coating 61' as shown in FIG. 9.

This double coating procedure including heating sealing the header tube between coats is particularly adaptable to obtaining a flat surface from which the leads 64 and 65 exit the encapsulant, illustrated in FIG. 9. This may be conveniently accomplished just prior to curing the second coating by pressing flat tool against the soft uncured epoxy to form the flat surface. Such a flat surface provides added stability to such a "radial" leaded component package having been mounted by the leads to a printed wiring board.

I claim:
1. A method for making a wet electrolyte capacitor having a free-form encapsulant comprising:
    a. connecting to an electrolytic valvemetal capacitor section, two lead wires that extend from an end of said section in the same direction;
    b. threading said leads through a plastic impregnation header via two parallel holes being provided therefor in said header;
    c. seating said header against said end of said section;
    d. applying and curing a free-form encapsulating coating to said section to a portion of said lead wires and to said header, a third hole extending through said header outwardly from said section, said third hole extending from said section in said direction of said leads;
    e. impregnating said encapsulated section by passing a wet electrolyte into said end through said third hole; and
    f. sealing closed said third hole at the opposite end from said section.

2. The method of claim 1 wherein said applying of said encapsulation is accomplished by dip coating said section into a liquid thermosetting resin and curing resin.

3. The method of claim 1 wherein said applying of said encapsulation coating is accomplished by coating said section with an uncured epoxy powder and curing said epoxy coating.

4. The method of claim 1 wherein said header has a tubular portion extending in said direction of said leads and the hole of said tubular portion being an extension of said third hole, and additionally comprising cutting off a portion of said tube prior to said sealing closed said third hole.

5. The method of claim 4 wherein said header is of a thermoplastic material, and wherein said cutting and sealing are accomplished simultaneously by applying a hot pinching tool to said thermoplastic tube.

6. The method of claim 5 additionally comprising holding said leaded capacitor section in a carrier bar by a further extended portion of said header tube during said applying of said coating and said impregnating.

7. The method of claim 6 wherein said holding is accomplished by inserting the tips of said leads into force fitting holes that are provided therefore in said further extended portion of said header, and by fastening said further extended header portion in a hole of said carrier bar, said hole of said tubular header portion extending through said further extended portion of said header into said hole of said carrier, and impregnating being accomplished by introducing said wet electrolyte into said hole of said carrier bar.

8. The method of claim 7 wherein a plurality of said leaded capacitor sections are held by their respective headers in said carrier bar.

9. The method of claim 1 wherein said applying and curing of said coating is accomplished by applying and curing a first coating, and then applying and curing a second coating thereover only after said impregnating and sealing steps.

10. The method of claim 1 wherein said header is of a thermoplastic material and wherein said sealing is accomplished by the local application of heat to and the reflowing of said thermoplastic header material in the vicinity of said third hole.

11. The method of claim 1 wherein the region of the surface of said encapsulating coating from which said leads extend is made flat by applying a flat tool against said coating prior to said curing.

* * * * *

UNITED STATES PATENT OFFICE
CERTIFICATE OF CORRECTION

Patent No. 4,035,905          Dated July 19, 1977

Inventor(s) Warren J. Clement

It is certified that error appears in the above-identified patent and that said Letters Patent are hereby corrected as shown below:

Column 2, line 27, "coat" should read -- cost --

Column 2, line 34, after "continuous" insert -- surface --

Column 2, line 59, delete "be" (first occurrence)

Column 2, line 67, "of" should read -- a --

Column 3, line 41, "leader" should read -- leaded --

Column 4, line 18, "would" should read -- wound --

Column 4, line 62, after "bar" insert -- hole --

Column 5, line 42, after "pressing" insert -- a --

Claim 7, line 8 (Column 6, line 39), "and" should read -- said --

Signed and Sealed this

Fourth Day of October 1977

[SEAL]

Attest:

RUTH C. MASON
*Attesting Officer*

LUTRELLE F. PARKER
*Acting Commissioner of Patents and Trademarks*